United States Patent [19]

Pierce et al.

[11] Patent Number: 5,273,211
[45] Date of Patent: Dec. 28, 1993

[54] TRAILER DEVICE FOR MIXING AND SPREADING SAND AND PEAT

[76] Inventors: Michael J. Pierce, 627 13th St., NW., E. Grand Forks, Minn. 56721; Kevin J. Pierce, Taft Ave., Grand Forks, N. Dak. 58201; Wayne A. Pierce, R.R. Box 45C, E. Grand Forks, Minn. 56721; Lyle S. Pierce, 3402 Cherry St., Grand Forks, N. Dak. 58201; Randal J. Dufault, R.R. Box 45C, E. Grand Forks, Minn. 56721

[21] Appl. No.: 828,467

[22] Filed: Jan. 30, 1992

[51] Int. Cl.$^5$ .............................................. A01C 17/00
[52] U.S. Cl. ................................. 239/656; 239/674; 239/676; 366/33; 366/49; 366/50; 366/186
[58] Field of Search ............... 239/656, 663, 670, 672, 239/674, 675, 676, 681, 685, 687; 366/33, 49, 50, 186, 150

[56] References Cited

U.S. PATENT DOCUMENTS

| | | | |
|---|---|---|---|
| 2,193,373 | 3/1940 | Munro | 239/656 |
| 2,489,801 | 11/1949 | Myott | 239/683 |
| 2,586,492 | 2/1952 | Ulrich | 239/687 |
| 3,220,740 | 11/1965 | Kavan et al. | 239/687 |
| 3,295,698 | 1/1967 | Ross et al. | 366/186 |
| 3,371,870 | 3/1968 | Harrer | 239/687 |
| 3,429,418 | 2/1969 | Fyrk | 239/687 |
| 4,405,089 | 9/1983 | Taylor | 239/656 |
| 4,575,010 | 3/1986 | Zimmerman | 239/674 |
| 4,624,575 | 11/1986 | Lantz | 366/50 |

OTHER PUBLICATIONS

Greensmix publication, E3481 Hwy. 22 & 54, Waupaca, WI 54981, date unknown.

Primary Examiner—Andres Kashnikow
Assistant Examiner—Karen B. Merritt
Attorney, Agent, or Firm—Robert E. Kleve

[57] ABSTRACT

The invention comprises a mobile trailer having a frame with a set of wheels on the frame for hauling the trailer and a pair of storage bins on the frame in side by side spaced relation with one bin adapted to a receive peat with a mixing blade to mix the peat and the other bin adapted to receive sand. The bins have openings along their bottoms and connecting openings along their vertical front walls with vertically adjustable plates to vary the sizes of the vertical openings. Horizontal conveyors are mounted beneath the bottom openings to the bins. Collecting and mixing blades are in the front of the trailer and a rotating spreader mounted to the rear upper portion of the trailer. An inclined conveyor is mounted with its lower end beneath the mixing blade and its upper end above the spreader. The trailer has power take off means with a drive connection to a tractor to be connected to power the collecting and mixing blades, the conveyors, and spreader, whereby the bin openings may be opened to selected sizes to allow the materials to gravitate from the bins onto the horizontal conveyors, and the horizontal conveyors may convey the materials to the collecting and mixing blades for collecting and mixing the materials and the inclined conveyor may convey the mixed materials of sand and peat up to the spreader to gravitate onto the spreader to spread the mixed materials on the ground.

4 Claims, 4 Drawing Sheets

TRAILER DEVICE FOR MIXING AND SPREADING SAND AND PEAT

This invention relates to trailers for hauling and handling materials.

It is an object of the invention to provide a novel mobile trailer having a pair of bins mounted in side by side relation for separately receiving materials to be mixed, with conveyor means beneath the bins along openings in the bins for receiving and conveying materials from the bins to a mixing chamber on the trailer having mixing blades for mixing the materials together, with means to adjust the ratio of the materials being mixed together and having conveying means to convey the mixed material after mixing to a spreader for spreading the mixed material on the ground.

It is another object of the invention to provide a novel wheeled trailer having a pair of bins for receiving and storing sand and peat separately, a collecting and mixing chamber, and a spreader with conveying means to convey the material from the bins to the collecting and mixing chamber for mixing the sand and peat together, and conveying means to convey the mixed sand and peat to the spreader for spreading the mixed sand and peat on the ground.

It is another object of the invention to provide a novel mobile trailer for hauling and for mixing sand and peat at a selected rate and at a selected site after hauling the sand and peat to the site, and for spreading the mixed sand and peat on the site, such as a golf course.

It is another object of the invention to provide a novel mobile trailer for hauling separate materials to a selected site, and mixing and distributing the materials at the selected site.

Further objects and advantages of the invention will become apparent as the description proceeds and when taken in conjunction with the accompanying drawings wherein.

Briefly stated, the invention comprises a mobile trailer having a wheeled frame with a pair of storage bins mounted thereon in spaced side by side relation for separately storing sand and peat, respectively, therein for hauling the sand and peat separately to a selected site, such as a golf green, for mixing and spreading the mix on the golf green, said trailer having horizontal endless belt conveyors mounted on the frame beneath openings in the bins, a collecting and mixing chamber at the forward end of the trailer and a spreader at the rearward end of the trailer, said horizontal conveyors conveying the sand and peat separately from the bins to the collecting and mixing chamber for collecting and mixing, and an inclined conveyor mounted between the bins and having its Lower end beneath the output end of the mixing chamber for receiving the sand and peat after being collected and mixed together, and conveying the mixed sand and peat upward to the rear of the trailer above the spreader where it may gravitate onto the spreader for spreading the mixed sand and peat on a golf green, while the trailer is on the site of the golf green and is being towed on the golf green, means adjusting individually the size of the bin openings to vary the ratio of sand and peat being conveyed, mixed, and spread on the green.

Figure 1:
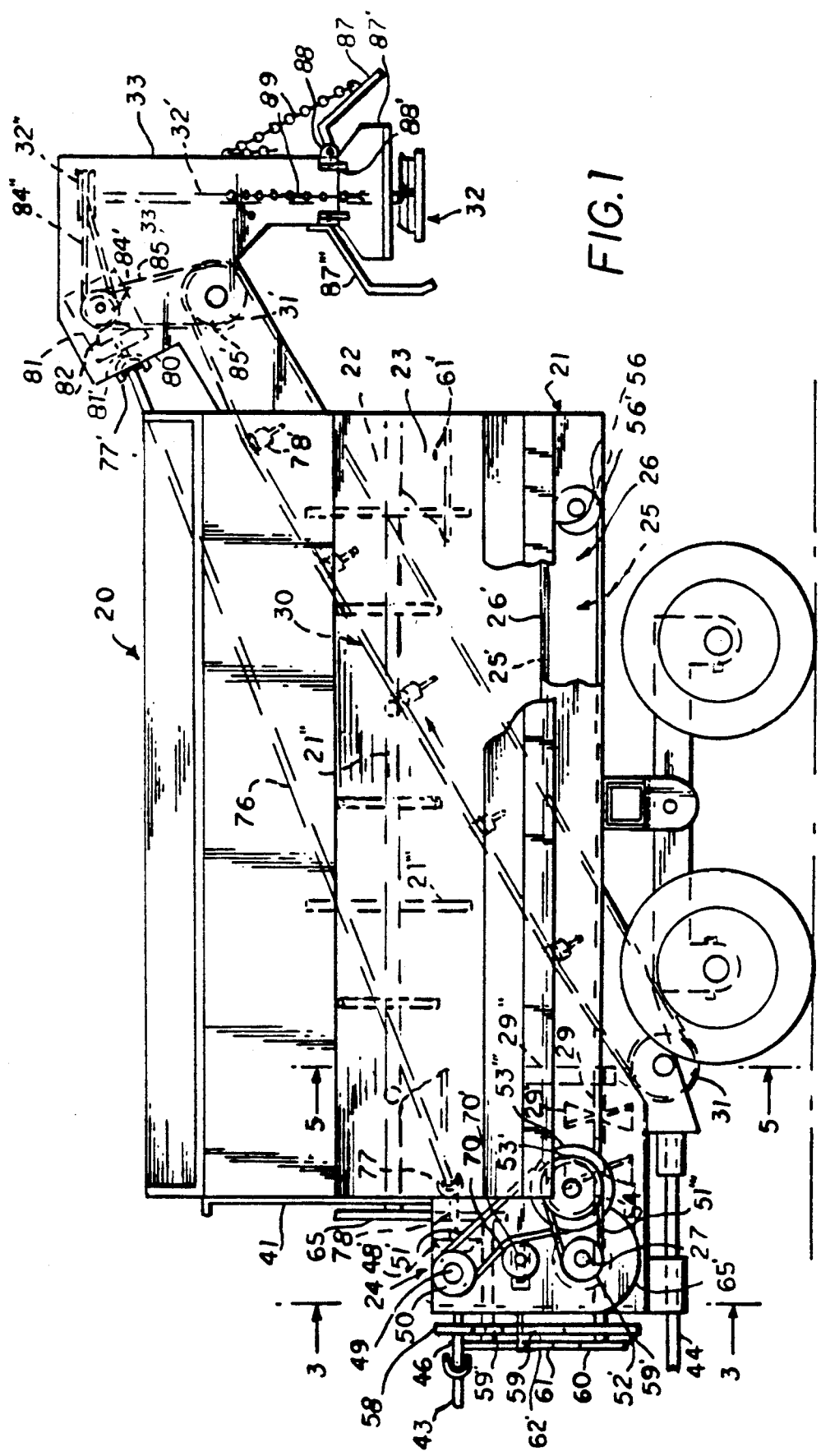
FIG. 1 is a side elevational view of the sand and peat hauling, mixing, and spreading trailer.
Figure 2:
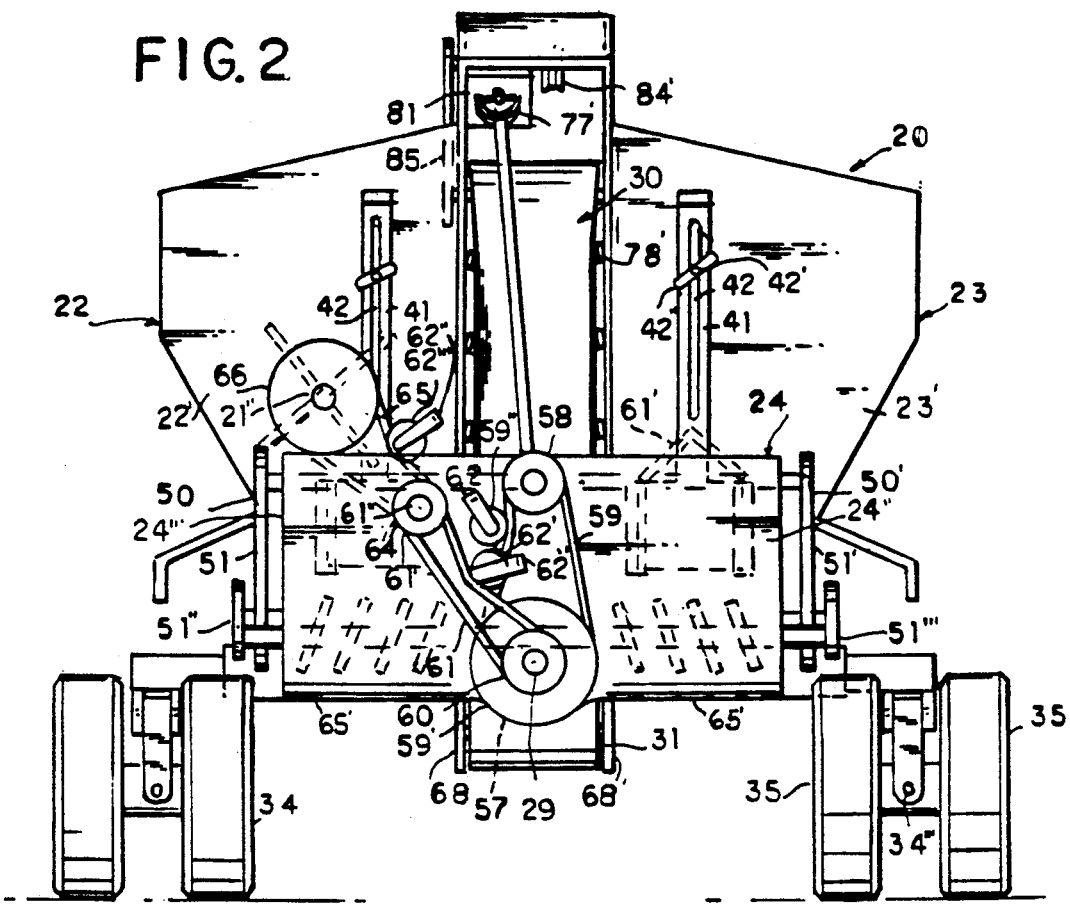
FIG. 2 is a front elevational view of the sand and peat wheeled trailer.

Referring more particularly to the drawings, in FIGS. 1 and 2, the sand and peat hauling, mixing, and spreading trailer 20 is illustrat-having a frame 21 with a pair of storage bins 22 and 23 mounted on the frame in side by side spaced relation. A rectangular housing 24 is mounted at the front of the bins extending laterally across the front of the bins. The trailer has a pair of horizontal conveyors 25 and 26 mounted beneath the openings 22" and 23" along the bottoms of the bins. A lateral shaft 27 extends laterally across the compartment or housing with its outer ends rotatably mounted in the side walls 24' and 24" of the housing. The shaft 27 has blades 28 and 28' along its opposite ends of opposite pitch spiralling along the shaft. A mixing shaft 29 has its one end rotatably mounted in the front wall 24'" of the housing and extends rearwardly beneath shaft 27. Its other end is rotatably mounted in a bracket 294 which bracket is fixed at its upper ends 29'" to the sides of the bins. An inclined conveyor 30 has an endless belt 30' mounted about its ends on rollers 31 and 31'. The rollers 31 and 31' are rotatably mounted in conveyor frame side frame members 68 and 68'. As reader 32 is fixed to a shaft 32', which shaft is rotatably mounted in a housing 33 fixed to the bins and to the conveyor frame at the rear of the trailer. The spreader may be detached from the rest of the housing along the separation line 33' in the housing.

The main frame of the trailer has four wheels 34 rotatably mounted along one side of the trailer, and four wheels 35 mounted along the other side of the trailer. Each set of four wheels can pivot about the center axis 34' of the longitudinally extending support arms 34", to pivot from front to rear, and each pair of wheels can pivot about lateral axes 34'" at each of the ends of the arms 34", to pivot to each side.

The bins 22 and 23 have a pair of baffle-plates 36 and 36' slidably mounted in slots 37 in the front walls 22' and 23' of the bins 22 and 23. The plates 36 and 36' slide over the front openings 38 and 38' in the lower front walls of the bins to vary the size of the openings and thereby vary the amount of peat and sand, respectively, that will be conveyed out from the bins by the horizontal conveyors 25 and 26 through through the openings.

The horizontal conveyors 25 and 26 have endless belts 25' and 26' which rotate counter clockwise on end rollers 54 at one end and end rollers 56 and 56' at the other end when viewed from FIG. 1.

The baffle plates 36 and 36' have rods 41 fixed to their upper ends which extend upward with slots 42 in the arms, and screws 42' are fixed to the front walls 22' and 23' of the bins and extend through the slot. Handles 42" are threaded onto the screws and are tightened against the rods to lock the rods at an adjusted height and thereby lock the baffle plates at an adjusted height for the size openings desired in the front walls for the peat and sand, respectively, to pass through.

The bins 22 and 23 are open at the top. The bin 22 is intended to receive and store peat. It has a rotating shaft 21", and the shaft 21" has radial arms 21'", which upon the rotation of the shaft, engages and mixes the peat in the bin. The bin 23 is intended to receive and store sand. An inverted V shaped steel plate 61' extends along the length of the bin 23 over the top of the conveyor 26, and its front and rear ends are fixed to the front and rear walls of the bin, and the plate 61' acts to prevent the full weight of the sand in the bin from directly weighing down on the conveyor 26.

A power take off connection 43 is mounted to the front of the trailer and a tow arm 44 is fixedly mounted to the front of the trailer for towing the trailer.

Within the housing 24, at the front of the trailer, is a transmission gear box 45, with an input shaft 46 in front of the gear box. The input shaft 46 is driven by the power take off connection being connected to the power take off of a tractor. The input shaft 46 drives gear 47, and gear 47 drives gear 48' and it in turns drives gear 48' in the gear box. Gears 47,48, and 48' are rotatably mounted in the gear box. Gear 48 is fixed to shaft 49 and drives the shaft. The outer ends of the shaft 49 are rotatably mounted in the sides of the gear box and gears 50 and 50' are fixed to the outer ends of the shaft and are driven by it. Gears 50 and 50' drives endless chains 51 and 51', which drive gear 53" and 53"', that drive chains 51" and 51"'.

The endless chains 51" and 51"' on opposite sides of the housing drive gears 52 and 52' fixed to the outer ends of shaft 27 to thereby drive the collector shaft 27 in the housing beneath the gear box. The endless chain 51 and 51' also drive gears 53 and 53' fixed to drive rollers 54 rotatably mounted in the side frame members 55 and 55' and the drive rollers in turn drive the horizontal endless belt conveyors in a counterclockwise direction when viewed from FIG. 1. Rollers 56 and 56' are rotatably mounted in frame portions 55 and 55' at the other ends of the conveyor belts 25 and 26 and rotate the other ends of the belts. Gears 53" and 53"' are fixed coaxially with gears 53 and 53'.

The mixing shaft 29 extends longitudinally rearward along the front portion of the trailer between the bins and beneath the lateral shaft 27 with the opposing spiral blades. The shaft 29 has a plurality of radial blades pitched to mix and auger the mixed material rearward toward the conveyor 30. The shaft 29 has a U channel housing 57 which surrounds the bottom and sides of the shaft and its blades and channels and conveys the sand and peat brought together by the opposing spiral blades, being augered rearward by the blades 29', onto the inclined conveyor 30, and also it enables the blades 29' of shaft 29 in rotating to mix the peat and sand together. A bottom curved plate portion 65' covers the bottom of the blades of shaft 27, on opposite sides of the shaft 29 and connects with the channeling housing 57.

A gear 58 is fixed to the input shaft 46 in front of the gear box and drives an endless chain 59, which in turn, drives gear 59' fixed to the forward end of the shaft 29, so that the input shaft 46 also drives the mixing shaft 29. An idler gear 59" is conventionally mounted on the front wall of housing 24 so as to be slidably adjustable in a slot in L bracket or plate 62 fixed on the front wall to adjust the engagement of the gear 59" to the chain to keep the chain taut.

A gear 60 is also fixed to shaft 29 in front of blades and outside the housing and it drives an endless chain 61. An idler gear 62' is mounted in a slotted L shaped bracket 62" which bracket is also fixed to the front wall 24" of the compartment. Chain 61 drives gear 61', which is fixed to a shaft 61" rotatably mounted on a support 63 fixed to the front wall 24'. The idler gear 62' engages chain 61 and keeps it taut. A gear 64 is fixed to the other end of shaft 61" and rotation of shaft 61" drives gear 64, which drives endless chain 65, and the endless chain drives gear 66 fixed to the front end of the peat mixing shaft 21" to thereby drive the mixing shaft. Another idler gear 62'" is mounted on another L shaped bracket 62" fixed to the front wall 22" of the peat bin, and is also slidably adjustable in the slot in the bracket to engage and keep endless chain 65 taut.

The inclined conveyor 30 has an endless belt 30' driven at its upper end, by a transmission shaft 76, which has U joints 77 and 77' mounted to its lower and upper ends. A shaft 78 connects to U joint 77 at one end is fixed coaxially to output gear 48' at its other end, so that shaft 46 drives transmission shaft 76. A series of lateral inclined rollers are 78' engage the edges of the conveyor belt 30', intermediate the ends of the belt to channel the edges of the belt upward, so as to channel and keep the mixed sand and peat on the conveyor belt as it is conveyed upward and rearward on the belt. The rollers are rotatably mounted on V shaped rods 67, fixed between the sides 68 and 68' of the conveyor belt 30.

The drive to side 24'" of the compartment 24 opposite to that shown in FIG. 1 is the reverse image of that shown in FIG. 1. Thus the drive to the gear 53 to drive conveyor 25, and the drive to the other end of shaft 27, is the reverse image of the drive to the conveyor 26, and the one end of the shaft 27, including the idler gear arrangement. On the side shown in FIG. 1, the idler gear 70 keeps chain 51', and is mounted on a conventional slotted adjustment bracket. Similarly, the idler gear 70' on side 24'", opposite that shown, would be the reverse image.

The spreader 32, at the rear of the trailer, is surrounded by a housing 33, which housing is fixed to the bins. A gear box 81 is mounted on top of housing 80, and its input shaft 81' is connected to the universal joint 77' of the transmission shaft 76. The input shaft 81' is rotatably mounted and has a gear 82 fixed axially thereto rotatably within the gear box, and gear 82 drives lateral gear 83. Gear 83 is fixed to a shaft 84, which shaft extends laterally through the gear box and is rotatably mounted to the box. A gear 83' is fixed to one end of shaft 84, axially to gear 83 outside the gear box, so that rotation of gear 83 drive gear 83'. Gear 83' drives an endless chain 85, and the endless chain 85 drives a gear 85' fixed axially to the upper roller 31' of the inclined conveyor whereby the transmission shaft 76 drives the upper roller 31' thereby driving the endless belt 30' clockwise when viewed from FIG. 1. A pulley 84' is fixed axially to shaft 84 outside the gear box so that shaft 84 also drives the pulley 84'. The pulley 84' drives an endless pulley belt 84" and the belt 84" drives a pulley 32" fixed to shaft 32', so that the transmission shaft 76 drives the spreader shaft and spreader 32, as well ad the conveyor 30.

The spreader 32 at the rear of the trailer has three conventional baffle plates 87, 87' and 87" which are pivotally mounted to the housing 33 by pivot axes 88, 88', and 88" by pins, to pivot about their respective axis toward and away from the spreader, to engage the mixed peat and sand being thrown outward by the spreader and limit the radius of travel of the mixture, by the rotational action of the spreader by engaging the material as it is thrown outward in a conventional manner. The baffle plate can be adjusted by chains 89 attached to the plates at their one ends and engages selectively in slots in the housing at their other ends, to thereby adjust the plates upward or downward. A fixed baffle plates 87''' is fixed to housing 33.

OPERATION

The hauling, collecting, mixing, and spreading trailer 20 operates to haul the peat and sand in separate bins to the golf greens, and while being towed about on the golf green acting to mix, and spread the mixture of sand and peat onto the green to place or fill the green surface with the customary composition of a mixture of peat and sand.

The trailer 20 will be filled with peat in the bin 22 and sand will be filled in bin 23. The trailer 20 will be attached to a tractor, will then be towed by the tractor to a selected golf green for filling, replacing or repairing the green with a composition mix of peat and sand. The power take off connection 43 of the trailer will be connected to the power take off of the tractor for powering the conveyors, collecting and mixing shafts, and the spreader. The trailer will be positioned on the green and towed about on the green, while sand and peat are mixed and spread by the spreader on the green with power take off activated.

The operator will adjust the height of the plates 36 and 36' covering openings 38 and 38' into the peat bin 22 and sand bin to obtain the desired size openings relative to one another for the selected ratio of mix of peat and sand conveyed out from the bins allowed out through the openings 38 and 38'. The horizontal conveyors will convey the peat and sand from the openings into the blades 28 and 28', of opposite pitch, which rotate clockwise in FIG. 1, and the spiral blades being of opposite pitch will auger the peat and sand together at the middle of shaft 27. It has been found that the direction of rotation of the spiral blades is important, so that the peat is applied evenly onto the sand.

Figure 3:
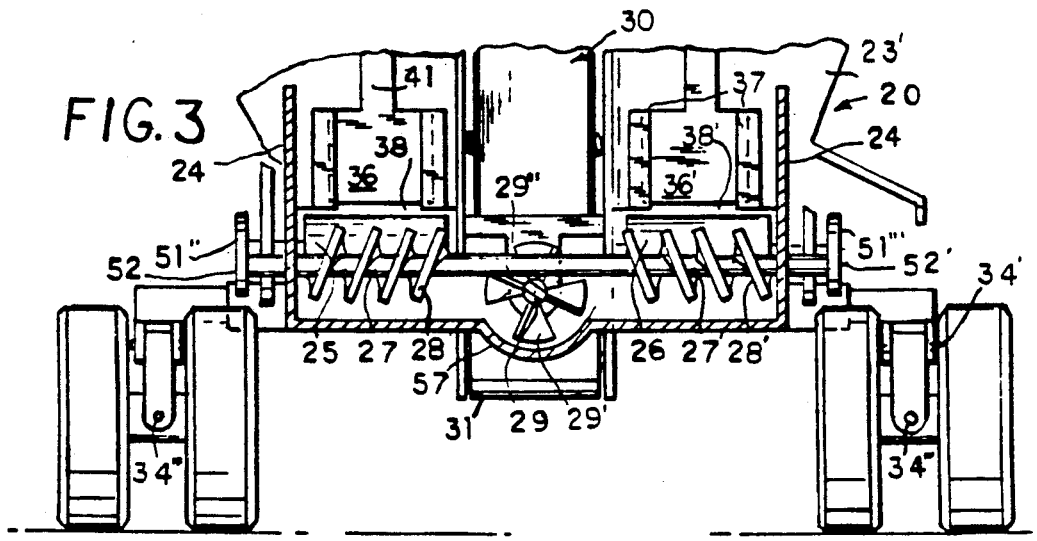
FIG. 3 is a front elevational cutaway view of the trailer taken along line 3—3 of FIG. 1.
Figure 4:
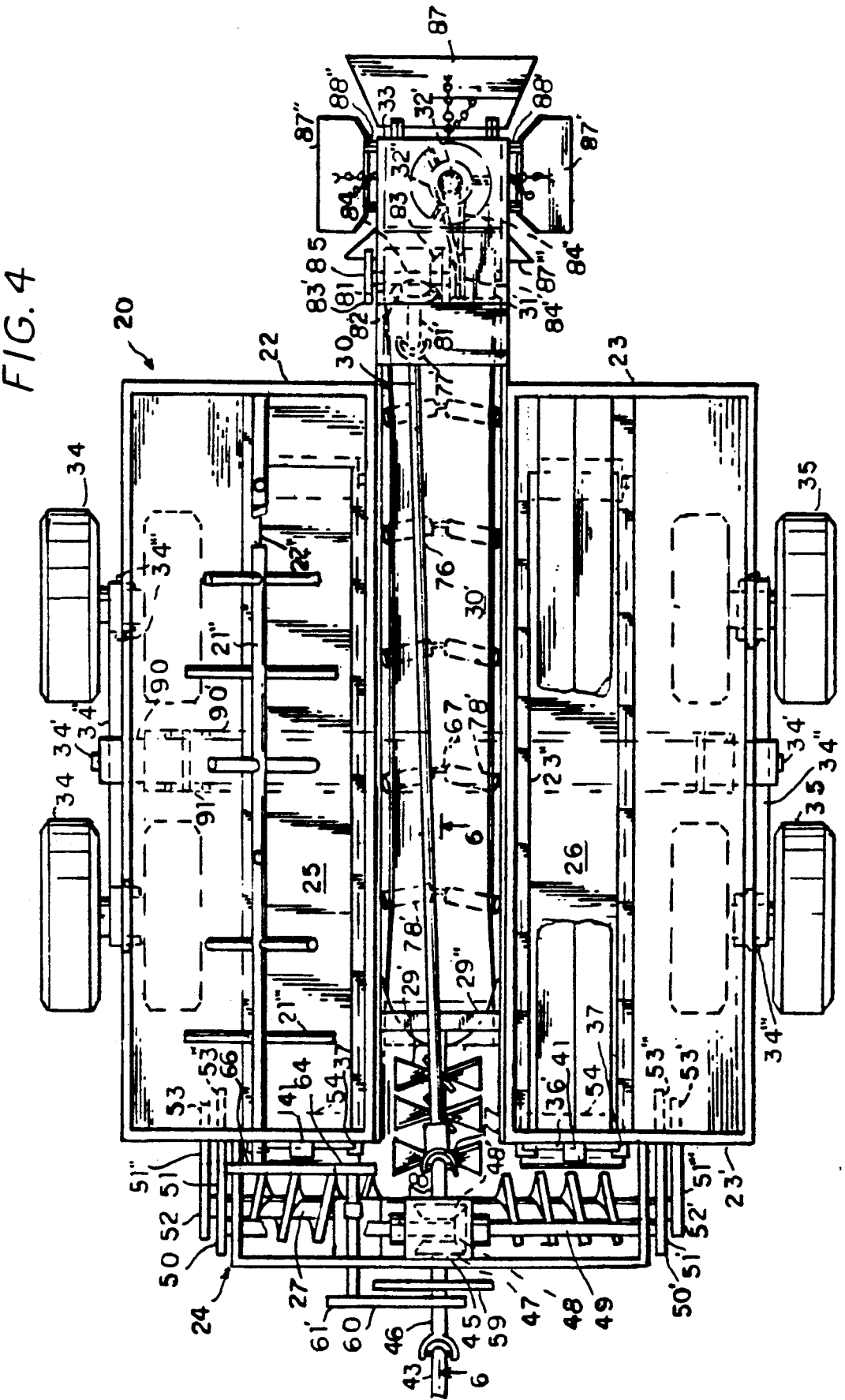
FIG. 4 is a top plan view of the sand and peat mobile trailer.
Figure 5:
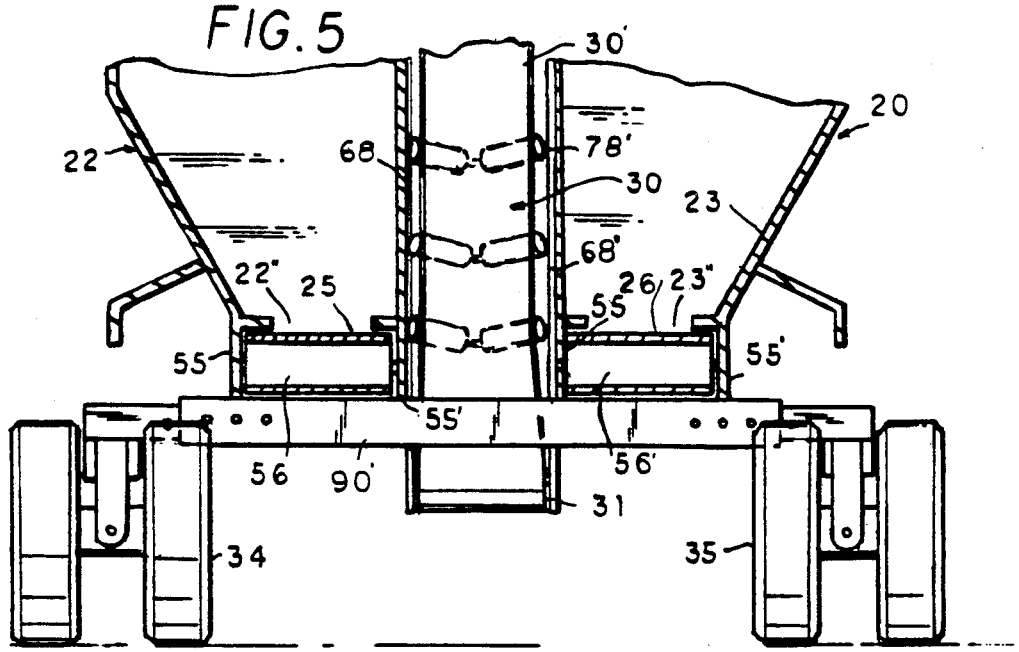
FIG. 5 is a front cutaway view of the trailer taken along line 5—5 of FIG. 1.
Figure 6:
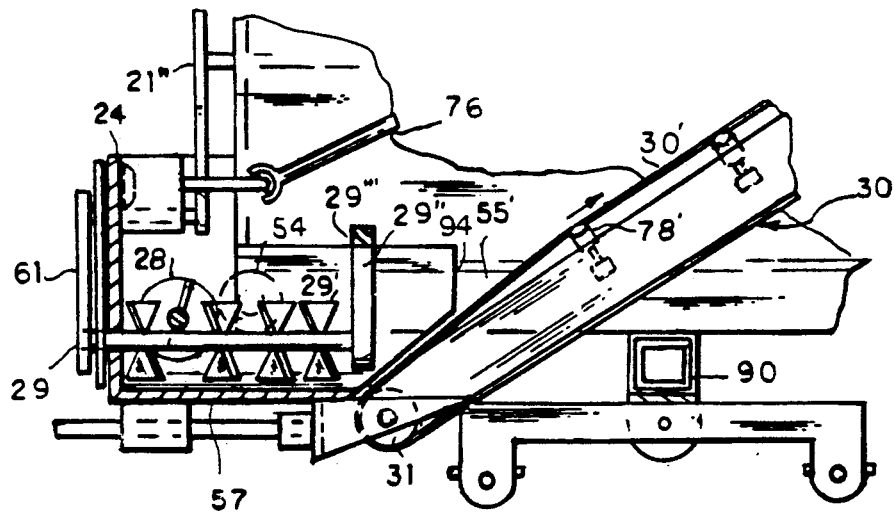
FIG. 6 is a fragmentary cross-sectional view of the trailer taken along line 6—6 of FIG. 4.

The mixing shaft 29 has pitched blades 29' which will upon rotation clockwise when viewed from FIG. 3 will auger the sand and peat accumulating beneath the middle of the shaft 27 rearward through the opening 94 into the housing onto the belt 30' of the conveyor 30 at its lower end.

The mixing shaft blades 29' have a pitch to auger the peat and sand mix rearward toward the conveyor 30, and the blades also act to more thoroughly mix the peat and sand together.

The conveyor belt of the conveyor 30 will convey the peat and sand mix from the mixing shaft 29 upward into the housing 33 where it will gravitate downward onto the spreader 31, and the rotation of the spreader will throw the peat and sand mix outward onto the golf green.

It has been found that a novel trailer has been provided which enables the peat and sand to be hauled in separate bins to a selected side, such as a selected golf green, and the bin opening plates can to adjusted to a selected ratio suitable for that particular green, and the power take off connection can activate the collecting and mixing shafts and conveyors and spreader to mix and spread the peat and sand onto the green, and then the trailer can be towed to another green and readjusted if necessary for that green and the peat and sand mix may be spread onto that green.

The spreader 32 is mounted relatively high upon the rear of the trailer, as it has been found that the peat and sand mixture will spiral out from the spreader upon its rotation, and that if the spreader is not sufficiently high off the ground, the mixture will not have enough time to spread out laterally from the spiral stream for more even spreading; and that by having the spreader relatively high it provides more time for the lateral spreading or more even spreading.

The trailer may mix and spread the peat and sand on the green while the trailer is being towed along moving on the green. The spreader can be left off the trailer, for mixing an conveying on the inclined conveyor onto a pile for stock piling the mix or loading onto another trailer.

Also, each set of wheels 34 and 35 can be telescopingly adjusted laterally toward or away from the sides of the trailer. The longitudinal arms 34'' are pivotally mounted on the rectangular metal channels 90 about the pivotal axes 34', and the channels 90 are slidable in and out of the channel 90' fixed to the underside of the frame 21 on frame members 55 and 55'. The fixed channel 90' has a series of holes 91 along each end in rows, and the channels 90 have one set of holes at each end which can be aligned with one of the series of holes in the fixed channel 90', and pins 91' can be extended through the holes in channels 90 and 90' to lock them in their adjusted position.

It will be obvious that various changes and departures may be made to the invention without departing from the spirit and scope thereof, and accordingly, it is not intended that the invention be limited to that specifically described in the specification or as illustrated in the drawings, but only as set forth in the appended claims wherein.

We claim:

1. A mobile trailer having a mobile frame, a pair of bins mounted on said frame in side by side spaced relation, a mixing chamber having a mixing blade for mixing sand and peat together, one of said bins being adapted to carry peat and having a mixing blade for mixing the peat in the bin, 'the other of said bins being adapted to carry sand, said bins having forward and rearward ends with the forward ends having adjustable openings for adjusting the amount of sand and peat allowed to travel out from the bins so that the desired ratio of peat and sand mix may be obtained, horizontal conveyors beneath the bins and the adjustable openings at the forward ends for conveying said sand and peat from the openings forward into the mixing chamber for said mixing chamber to mix the sand and peat together; an inclined conveyor in a space between the bins having a lower end beneath the mixing chamber and extending rearward and upward for conveying sand and peat rearward and upward to the rear of the trailer and having a rearward upper end; a rotating spreader at the rear of the trailer, spaced above the ground and beneath the upper end of the conveyor, to receive and spread the mixed sand and peat from the conveyor onto the ground.

2. A mobile trailer having a mobile frame, a pair of bins mounted on said frame in side by side spaced relation and having front and rear ends; a mixing chamber mounted on said frame in front of said bins having a mixing blade for mixing sand and peat together; one of said bins being adapted to carry peat with a mixing blade for mixing the peat and the other bin being adapted to carry sand; said bins having openings along their bottoms and vertically adjustable openings along their front ends for adjusting the amount of peat and sand allowed to travel from the bins so that the desired ratio of sand and peat from the bins may be obtained;

conveyors beneath the openings in the bottoms of the bins and the adjustable openings in the front ends of the bins for conveying said sand and peat from the bins to the mixing chamber o the trailer to mix the sand and peat together; and inclined conveyor mounted in a space between the bins having a lower front end beneath the mixing chamber for receiving the sand and peat mixed by the mixing chamber and having a rearward upper end for conveying the mixed sand and peat rearward and upward to the rear of the trailer; a rotating spreader at the rear of the trailer, spaced above the bottom of the trailer and beneath the rearward upper end of the inclined conveyor to receive and spread the mixed sand and peat from the conveyor onto the ground.

3. A mobile trailer having a mobile frame, a pair of bins mounted on said frame in side by side spaced relation and having front and rear ends, a mixing chamber mounted on said frame in front of said bins having a mixing blade for mixing two different materials together, one of said bins being adapted to carry one of said materials, the other of said bins being adapted to carry the other of said materials, said bins having openings along their bottoms and vertically adjustable openings along their front ends for adjusting the amount of the two materials allowed to travel from the bins so that the desired ratio of the two different materials may be obtained, conveyors beneath the openings in the bottoms of the bins and the adjustable openings in the front ends of the bins for conveying the two different materials from the openings in the two bins to the mixing chamber on the trailer to mix the two materials together, an inclined conveyor mounted in a space between the conveyors having a front lower end beneath the mixing chamber for receiving the two materials mixed together by the mixing chamber and having a rearward upper end for conveying the mixed materials rearward and upward to the rear of the trailer.

4. A mobile trailer according to claim 3, wherein said mobile frame further comprises a plurality of sets of wheels on each lateral side of said mobile frame, with telescoping rod means extending laterally across the underside of said mobile frame in coaxial relation with said sets of wheels and with said sets of wheels being mounted to said telescoping rod means to adjust laterally and coaxially toward and away from said mobile frame in telescoping relation.

* * * * *